ヘンリー

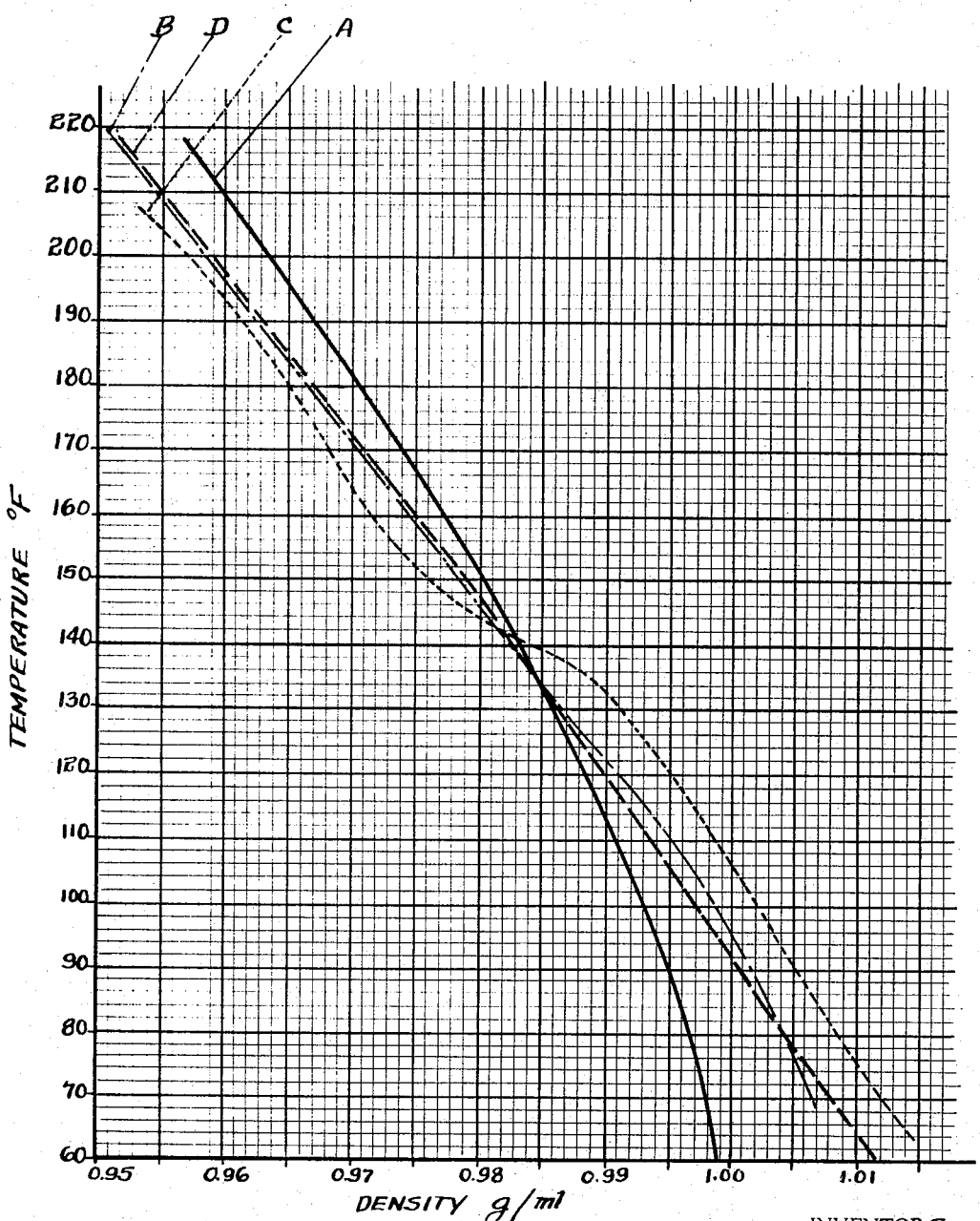

United States Patent Office 3,356,738
Patented Dec. 5, 1967

3,356,738
PURIFICATION OF WATER-INSOLUBLE HYDROXYL-CONTAINING POLYETHERS
Henry W. Hauser, Naperville, Kurt L. Schoenrade, Chicago, and Scott J. Russell, Summit, Ill., assignors to Witco Chemical Company, Inc., New York, N.Y., a corporation of Delaware
Filed Dec. 11, 1963, Ser. No. 329,675
9 Claims. (Cl. 260—615)

Our invention is concerned with improvements in procedures for removing undesirable water-soluble impurities or reaction components from essentially water-insoluble hydroxyl-containing polyethers, notably from essentially water-insoluble normally liquid polyethers in the form of polypropylene glycols.

Essentially water-insoluble hydroxyl-containing polyethers, hereafter, for convenience, called polyethers, are commonly used for the production of urethane polymers. The said polyethers are reacted with polyisocyanates, in the presence of added catalysts and other materials, to produce the urethane polymers which may be in the form of rubber-like elastomers, foams of flexible or rigid character, and the like. In order that urethane polymers of desired properties and characteristics be produced, it is important that the polyethers to be reacted with the polyisocyanates be essentially free of impurities which may function as undesirable catalysts or otherwise undesirably in the urethane polymer reaction.

Polyethers as commercially prepared, in crude form, contain for instance, various water-soluble impurities such as alkali metal hydroxides or other metal salts, or if acid catalysts are used, acidic materials. So far as we are aware, present commercial practices for the removal of water-soluble impurities, generally speaking, involve treating the crude polyether with adsorbents, commonly claytype absorbents, followed by filtration. Such known treatments, while reasonably effective for the removal of undesirable water-soluble impurities from the polyethers, have serious disadvantages because of economic considerations since they result in undue losses of the polyethers and they entail the costs for the adsorbent, the filtration operation, and adsorbent revification if efforts are made to reuse the adsorbent after it has become spent. Ordinary water-washing of the crude polyethers has not proved feasible because of the very small differences of the specific gravities of the polyethers and wash water at room temperatures or thereabouts, in addition to the fact that some polyethers have comparatively high viscosities at room temperatures or slightly above room temperatures and, indeed, some are pastes or solids.

Our invention is based upon the discovery that, at certain temperatures, generally elevated and particularly slightly below the boiling point of water at atmospheric pressure, there is a sufficient difference in the specific gravities of the polyether and water, or water containing dissolved therein the water-soluble impurities from the crude polyethers, to permit ready and effective separation, by high speed centrifugal action, of the polyether from the water solution of said water-soluble impurities. We have found, among other things, that, when a mixture of water and a polyether are heated, not only does the viscosity of the polyether tend to decrease with increasing temperature but, generally speaking, its specific gravity or density, at certain elevated temperatures, decreases at a rate or to an extent greater than does water or the water solution of the water-soluble impurities. The result is that, within certain temperature ranges, the difference in specific gravities or densities becomes of sufficient magnitude to permit separation of the purified polyether from the water solution of the impurities by high speed centrifugal action.

The temperature range at which the differences in specific gravities or densities becomes sufficiently great to permit effective high speed centrifugal separations varies, being dependent primarily upon the particular polyether involved. Various polyethers, including many which are commonly used in the preparation of urethane polymers, have densities at room temperature which are greater than that of water. However, as stated above, it has been found, surprisingly, that, on heating the same, in admixture with water, to certain temperatures, the density of such polyethers decreases to an appreciably greater extent than does the density of water so that, at said certain elevated temperatures, the density of the polyether becomes lower than the density of water at such temperatures and, indeed, sufficiently lower to provide the necessary density differential to permit effective centrifugal separation and make possible the practice of our present invention.

In the case of certain polyethers, at elevated temperatures, but below the boiling point of water at atmospheric pressure or at the particular pressure involved, the specific gravity or density does not become lower than that of water but, even in such cases, where the density difference is sufficiently great between the polyether and water, effective separations can be made. These situations, where the density of the polyether at the elevated temperature involved is greater than that of water, are not commonly encountered and, therefore, our invention has its greatest and most significant value in the areas where, at such elevated temperatures, the density of the polyether decreases to an appreciably greater extent than does the density of water so that, at the elevated temperature at which centrifugal separation is carried out, the water has a density which is greater than that of the polyether.

Generally speaking, most of the polyethers, with the purification of which our present invention deals, are those which fall into the category of hydroxy terminated polyether glycol polymers consisting of carbon, hydrogen and oxygen which have a molecular weight of at least 600 and, more particularly, a molecular weight of 1,000 to 7,000 and, as described in U.S. Patent No. 2,866,774, they compromise condensation products of an alkylene oxide having from 2 to 4 carbon atoms and about 0.01 to 10 mol percent, based on the alkylene oxide, of a polyhydric alcohol having less than 7 carbon atoms and having 3 to 6 primary hydroxyl groups, at least 20% of said alkylene oxide having more than 2 carbon atoms. In U.S. Patent No. 3,072,582, these and other polyethers, with the purification of which our present invention deals, are characterized as being essentially hydroxyl terminated polyether polyols, and they are more particularly described as comprising essentially hydroxyl terminated branched chain polyether polyols containing from 3 to 8 hydroxyl groups. Our invention is particularly useful in effecting removal of impurities from essentially or practically water-insoluble normally liquid polypropylene glycols or polyoxypropylene ethers which, for instance, are prepared by condensing propylene glycol or glycerol with 1,2-propylene oxide, in the presence of an alkali or other catalyst, to produce polypropylene glycols or polyoxypropylene ethers having average or random molecular weights in the range of about 1,000 to 7,000, and, better still, in the range of about 1,500 to 4,000. In its broadest aspect, the polyethers, the removal from which of water-soluble impurities is the object of our present invention, may be characterized as being essentially or practically water-insoluble hydroxyl-containing polyethers. The polyethers may contain substituent groups so long as they are essentially non-reactive with polyisocyanates in those instances in which the purified polyethers are subsequently to be utilized in reactions with polyisocyanates.

Referring, now, to the drawing, curves are shown involving three different polyethers comprising polypropylene glycols. Curve A shows the variation in the density of water in terms of grams per milliliter measured against changes in temperature (degrees F.) in the range of 60 to somewhat above 210 degrees F. Curves B, C and D show corresponding density-temperature variations in the case of polypropylene glycols having average molecular weights, respectively, of 3,000 (curve B), 1,500 (curve C) and 3,500 (curve D). It will be noted that, in the case of each of curves B, C and D, they intersect the curve A. At the temperature represented by the point of intersection of each of the curves B, C and D with the curve A, the densities of the particular polypropylene glycol and water are the same and, of course, at such temperature, centrifugal separation is impossible.

Considering curve B, by way of illustration, in relation to curve A, it will be seen that the intersection of said two curves is at a point represented by a temperature of approximately 135 degrees F. At a temperature of 140 degrees F., the difference in densities between water and the polypropylene glycol is only about 0.001 gram per milliliter. This difference is too small to permit practical separations even with relatively high speed separations. At a temperature, for instance, of 200 degrees F., the density difference is approximately 0.005 gram per milliliter and this difference is entirely adequate to enable highly effective separations to be made. Indeed, at such temperature, it has been found that practically quantitative separation by high speed centrifugation can be made of the purified polyether from the water-soluble impurities contained in the original impure polyether. Generally speaking, a difference in density between the polyether and water of the order of at least 0.004 and, better still, at least 0.005 or 0.006 gram per milliliter is sufficient to permit good separations without undue losses of the polyether. In terms of temperature at which centrifugation is effected, which, as pointed out above, reflects density differentials, it is especially desirable to operate in a temperature range from about 22 degrees F. below the boiling point of water to just below the boiling point of water at the pressure under which the centrifugation procedure is carried out. In the usual case, of course, it is desirable to carry out the centrifugation at atmospheric pressure and, in such case, the centrifugation is especially desirably conducted while the mixture of the crude polyether and water is at a temperature in the range of about 190 to 210 degrees F., particularly 205 to 210 degrees F.

In those instances in which, because of dealing with relatively high viscosity polyethers, or melting point ranges of particular polyethers, or where temperatures in excess of 212 degrees F. are required in order to establish a point at which there is a sufficient density differential between the polyether and water to permit satisfactory centrifugal separation to be effected, it is necessary to carry out the centrifugation at temperatures in excess of 212 degrees F., then, of course, the heating of the mixture of the polyether and water and the centrifugation procedure will be carried out under pressures sufficient to raise the boiling point of the water phase above such temperatures.

From an examination of curves B, C and D, in relation to curve A, it will also be seen there is also an appreciable temperature range, below the points at which each of said curves B, C and D intersect with the curve A, at which the density difference between the respective polyethers and water are even greater than those at the substantially more elevated temperatures discussed above. While, theoretically, this would appear to permit centrifugal separations to be made of the polyether and wash water at lower temperatures, for instance, of the order of 60 to 90 degrees F., there are other factors which make such possible procedures of no practical or commercial value. These involve viscosity consideration, which play a role in the purification procedure, and economic considerations centering around cooling and reheating operations which can be avoided by the practice of our invention.

The amount of water used, in relation to that of the crude polyether to be purified, is variable. Generally speaking, the amount of water will fall in the range of about 35 to 200% and, better still, in the range of about 80 to 120%, by weight, of the weight of the crude polyether although lesser or greater quantities of water can be employed. It is preferred, in most cases, to utilize approximately equal weights of the crude polyether and water.

The centrifugation step can be carried out with various types of commercial centrifugal separating equipment, vertical disc stack type centrifugal separators being very satisfactory. Multiple gravitation forces utilized in the operation of such centrifugal separators will generally fall within the range of about 8,000 to 13,000 g, and preferably about 10,000 g, although satisfactory results can be obtained in the centrifugal separators operating at somewhat lesser as well as at somewhat greater multiple gravitation forces. With a centrifugal separator of the foregoing type operating at about 10,000 g, good separations at a rate of the order of 6 gallons of polyether from 6 gallons of water per minute are obtained.

While good separations of water-soluble impurities can be obtained by a single water wash-centrifugation cycle, it is desirable to repeat the wash-centrifugation cycle a second time and, in particularly refractory cases, an additional one or more water wash-centrifugations may be necessary to effect as complete a removal of water-soluble impurities from the starting crude polyether as may be desired in any given case. In general, however, two water wash-centrifugation cycles will be found to effect essentially complete removal of water-soluble impurities from the crude polyether, for all practical purposes. In illustrative instances of the practice of our invention, starting with crude polypropylene glycols containing of the order of 0.2 to 0.3% of water-soluble impurities, purified polypropylene glycols containing only from 5 to 10 parts per million, and, in certain cases even less, of water-soluble impurities have been obtained in commercial runs. Furthermore, in the practice of the method of our invention, only negligible amounts of the starting polyether are lost, generally in the order of 0.05 to 0.3%. The purified polyether, as it issues from the centrifugal separator, will commonly contain a small amount of water, generally in the range of about 1 to 6%, which, if desired, can easily be removed by conventional procedures as, for instance, by heating or under vacuum or by a combination of both procedures. The method of our invention can be operated, as desired, on either a batch basis or as a continuous procedure.

In the practice of our nivention, it is especially desirable that the wash water, with which the crude polyether is admixed prior to the centrifugation step, be quite soft. This is particularly the case where alkaline catalysts have been used in the production of the crude polyethers and the water-soluble impurities are of alkaline character. In this situation, if hard waters are used, precipitates separate out and coat the centrifugal separator walls and passages, necessitating relatively frequent shut-downs in order to clean the centrifugal separators. Soft waters are, therefore, indicated to avoid this objection. In those instances where an acid catalyst is employed in producing the crude polyether and the water soluble impurities are of acid character, then hard waters are distinctly less objectionable and can be used quite satisfactorily. As a general practice, however, soft waters (containing less than 60 p.p.m. of calcium and magnesium calculated as calcium carbonate) are preferably employed and, in those instances in which only hard waters are available, they may be softened in any suitable known manner as, for example, by de-ionization procedures such as treatment by zeolites or ion exchange resins so that their hardness is of the order of 60 p.p.m. or less, indeed, down to the order of so-called "zero" hardness.

The following examples are illustrative of the practice of the method of the invention. It will be understood that various changes may be made such as the utilization of different polyethers, different proportions of water in relation to the polyether, and the selection of different temperatures, without in any way departing from the principles and teachings disclosed herein. The examples are, therefore, not to be construed as being in any way limitative of the scope of the invention.

*Example 1*

100 gallons of a crude polypropylene glycol [1] having an average molecular weight of about 3,000, at an elevated temperature as removed from the autoclave in which it is produced, and 100 gallons of soft water are admixed in a continuous pipeline mixer to provide a mixture having a temperature of 200–205 degrees F. The mixture is maintained at about 10 degrees F. (± degrees F.) below the boiling point of water and is fed into a continuous centrifugal separator of the vertical disc stack type operating at about 10,000 g. The water phase, containing less than 0.05% of the polypropylene glycol phase, is discarded. The recovered polypropylene glycol phase is again mixed with an equal volume of soft water and the resulting mixture, heated to the aforesaid temperature, is again passed through the centrifugal separator. The polypropylene glycol issuing from the separator is dried by sparging it under reduced pressure, for example, under a vacuum of 25 to 28 inches of mercury, and agitation with an inert gas as, for instance, nitrogen or argon. The yield of purified polypropylene glycol is in excess of 99%, it is neutral in reaction, and, when used in a standard formulation for the production of a polyurethane foam, produced a very satisfactory foam.

*Example 2*

100 gallons of a crude polypropylene glycol, prepared in the manner referred to in Example 1 but having an average molecular weight of 3,500, and 100 gallons of soft water, each at a temperature of 200–205 degrees F., are admixed in a continuous pipeline mixer and maintained at about 10 degrees F. (±5 degrees F.) below the boiling point of water. A two centrifugal separator set-up is employed, the centrifugal separators corresponding to the one described in Example 1 and operating under similar conditions. The polypropylene glycol-water mixture is fed to the first centrifugal separator and the clear water effluent is discarded. The one-washed polypropylene glycol is allowed to stand for at least several minutes, say at least 5 minutes. It is then mixed at a controlled rate, in a pipeline mixer, with fresh soft water before it is fed, at the aforesaid elevated temperature, into the second centrifugal separator. The aforesaid standing or retention time, before the one-washed polypropylene glycol is fed to the second centrifugal separator, results in a further material removal of water-soluble impurities during the second centrifugation step. The washed purified polypropylene glycol leaving the second centrifugal separator is essentially free of water-soluble impurities and has a moisture content of about 4%. The water is removed in the manner described in Example 1. The wash water issuing from the second centrifugal separator is used to wash a fresh batch of crude polypropylene glycol in the first centrifugal separator. If desired, as stated previously, the second-washed polypropylene glycol can be washed once or twice more in the manner described, if an exceptionally high purity polypropylene glycol is sought for certain special purposes.

What we claim as new and desire to protect by Letters Patent of the United States is:

1. In a method of removng water-soluble impurities from water-insoluble hydroxyl-containing polyethers, the steps which comprise providing a mixture of water with a normally liquid essentially water-insoluble hydroxyl-terminated polyether polyol having a molecular weight in the range of 600 to 7,000 and consisting of carbon, hydrogen, and oxygen at an elevated temperature, below the boiling point of water at the pressure involved, at which there is a difference in density between the water and the polyether sufficient to permit centrifugal separation of said polyether and said water, and then effecting centrifugal separation, at said elevated temperature, of said polyether from said water containing dissolved therein substantially all of said water-soluble impurities.

2. In a method of removing water-soluble impurities from water-insoluble hydroxyl-containing polyethers, the steps which comprise providing a mixture of water with a normally liquid essentially water-insoluble hydroxyl-terminated polyether polyol having a molecular weight in the range of 600 to 7,000 and consisting of carbon, hydrogen, and oxygen at a temperature in the range of about 190 degrees F., to below the boiling point of water at atmospheric pressure, at which there is a difference in density between the water and the polyether sufficient to permit centrifugal separation of said polyether and said water, and then effecting centrifugal separation, at the aforesaid temperature, of said polyether from said water containing dissolved therein substantially all of said water-soluble impurities.

3. In a method of removing water-soluble impurities from normally liquid essentially water-insoluble hydroxyl-containing polyoxypropylene polyethers having a molecular weight in the range of 600 to 7,000 and consisting of carbon, hydrogen, and oxygen, the steps which comprise providing a mixture of water with an essentially water-insoluble hydroxyl-containing polyoxypropylene polyether at a temperature in the range of about 190 degrees F., to below the boiling point of water at atmospheric pressure, at which there is a difference in density between the water and the polyether of at least 0.004 gram per milliliter, the water constituting from 80 to 120% by weight of the polyether in said mixture, and then effecting centrifugal separation, at the aforesaid temperature, of said polyether from said water containing dissolved therein substantially all of said water-soluble impurities.

4. In a method of removing water-soluble impurities from a normally liquid essentially water-insoluble polypropylene glycol having an average molecular weight in the range of 1,000 to 7,000 and consisting of carbon, hydrogen and oxygen, the steps which comprise admixing said glycol with from 35 to 200% of its weight of water, and feeding said glycol-water mixture, at a temperature in the range of about 190 degrees F. to below the boiling point of water at atmospheric pressure, to a centrifugal separator whereby to effect separation of said glycol from the water containing essentially all of said water-soluble impurities.

5. In a method of removing water-soluble impurities from a normally liquid essentially water-insoluble polypropylene glycol having an average molecular weight in the range of 1,500 to 4,000 and consisting of carbon, hydrogen and oxygen, the steps which comprise admixing said glycol with from 80 to 120% of its weight of water, and feeding said glycol-water mixture, at a temperature in the range of about 190 degrees F. to below the boiling point of water at atmospheric pressure, to a vertical disc stack type centrifugal separator operating at about 8,000 to 13,000 $g$ to effect separation of said glycol from the water containing essentially all of said water-soluble impurities.

---

[1] 30 parts of KOH are dissolved in 304 parts of propylene glycol and placed in a stainless steel autoclave. Over a period of about 8 hours there are added gradually, under stirring, 1700 parts of propylene oxide. The reaction temperature is in range from 200 to 250 degrees F., and the pressure does not exceed 75 pounds per square inch. From this reaction product, 500 parts are retained in the autoclave and further reacted with 1500 parts propylene oxide under similar conditions as described above. The excess propylene oxide is removed under vacuum. All parts are by weight.

6. In a method of removing water-soluble impurities from essentially water-insoluble hydroxyl-containing polyethers, the steps which comprise admixing water with a normally liquid essentially water-insoluble hydroxyl-terminated polyether polyol having a molecular weight in the range of 600 to 7,000 and consisting of carbon, hydrogen, and oxygen of the type which, at room temperature, is a liquid whose density is greater than that of water but which, at elevated temperatures slightly below the boiling point of water has a density appreciably less than that of water at said elevated temperatures, feeding into a centrifugal separator a mixture of water with said polyether at a temperature slightly below the boiling point of water, recovering the purified polyether from said centrifugal separator, again admixing said recovered purified polyether with water, again passing said mixture at the aforesaid temperature through a centrifugal separator, and recovering the purified polyether.

7. A method in accordance with claim 6, wherein the polyether recovered from the first centrifugal separation is allowed to stand for at least several minutes before it is subjected, in admixture with the water, to the second centrifugal separation.

8. In a method of removing water-soluble impurities from a normally liquid essentially water-insoluble hydroxyl-terminated polyether polyol having a molecular weight in the range of 600 to 7,000 and consisting of carbon, hydrogen, and oxygen, the steps which comprise admixing soft water with an essentially water-insoluble hydroxyl-containing polyether of the type which, at room temperature, is a liquid whose density is greater than that of water but which, at elevated temperatures slightly below the boiling point of water has a density appreciably less than that of water at said elevated temperatures, feeding into a centrifugal separator a mixture of soft water with said polyether at a temperature slightly below the boiling point of water, the water constituting from 35 to 200% of the weight of the polyether, recovering the purified polyether from said centrifugal separator, again admixing said recovered purified polyether with soft water in the aforesaid proportions, again passing said mixture at the aforesaid temperature through a centrifugal separator, and recovering thhe purified polyether.

9. A method in accordance with claim 8, wherein the centrifugal separator is of the vertical disc stack type and operates at about 8,000 to 13,000 g.

References Cited

UNITED STATES PATENTS

| 2,425,845 | 8/1947 | Toussant et al. |
| 2,496,582 | 2/1950 | Enyeart. |
| 2,899,411 | 8/1959 | Schollenberger __ 260—616 XR |

FOREIGN PATENTS

| 601,604 | 5/1948 | Great Britain. |

LEON ZITVER, *Primary Examiner.*

H. T. MARS, *Assistant Examiner.*